(12) United States Patent
Graf

(10) Patent No.: US 6,397,251 B1
(45) Date of Patent: May 28, 2002

(54) FILE SERVER FOR MULTIMEDIA FILE DISTRIBUTION

(75) Inventor: Marcel Graf, Grafenau (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/231,395

(22) Filed: Jan. 13, 1999

Related U.S. Application Data

(62) Division of application No. 08/894,907, filed on Sep. 2, 1997.

(51) Int. Cl.⁷ .................. G06F 15/173; G06F 15/177

(52) U.S. Cl. .............................. 709/225; 709/226

(58) Field of Search ..................... 709/202, 231, 709/253, 226, 227, 236, 204, 218, 219, 225; 707/501, 10, 513, 203; 370/85, 410; 713/159; 345/327; 364/514

(56) References Cited

U.S. PATENT DOCUMENTS

| | | | | |
|---|---|---|---|---|
| 5,768,527 A | * | 6/1998 | Zhu et al. | 709/231 |
| 5,828,837 A | * | 10/1998 | Elkeland | 709/202 |
| 5,894,559 A | * | 4/1999 | Krishna et al. | 709/253 |
| 5,914,950 A | * | 6/1999 | Tiedemann, Jr. et al. | 370/348 |
| 5,983,004 A | * | 11/1999 | Shaw et al. | 709/227 |
| 6,125,398 A | * | 9/2000 | Mirashrafi et al. | 709/236 |
| 6,195,678 B1 | * | 2/2001 | Komuro | 709/202 |
| 6,279,039 B1 | * | 8/2001 | Bhat et al. | 709/226 |
| 6,285,892 B1 | * | 9/2001 | Hulyalkar | 455/574 |
| 6,292,492 B1 | * | 9/2001 | Bonomi et al. | 370/415 |

OTHER PUBLICATIONS

Kornaros et al, Pipeline Muliti–Queue Management in a VLSI ATM switch chip with Credit–Based Flow–Control, IEEE 1997.*

Katevenist et al, Credit Flow Control ATM for MP Interconnection: the ATLAS I Single Chip ATM Switch, IEEE 1998.*

Ren et al, Design & Ananlysis of a Credit–Based Controller for Congestion Control in B–ISDN/ATM network, IEEE 1995.*

(List continued on next page.)

Primary Examiner—Mark H. Rinehart
Assistant Examiner—Thong H Vu
(74) Attorney, Agent, or Firm—Bracewell & Patterson, LLP

(57) ABSTRACT

Disclosed is a technique for distribution of multimedia files from file servers (110) over arbitrary telecommunication networks (150) to consumers (160) where those networks offer connections of a certain bandwidth for transmission. The consumers deliver requests for presentation of multimedia files, and the file servers deliver those files with respect to said requests for presentation. According to the proposed method, the transmission rates of the multimedia files are smoothed by spreading the transmission over time leading to additional delays in the delivery of said information. Minimum transmission rates for maximum values of the delays are calculated, and these values are provided as control data for the transmission. These control data are appended to the respective multimedia files, and the multimedia files are delivered to the receivers with respective additional, delays between the requests for presentation and the presentation of the files, corresponding to the maximum delays. By the proposed method, time critical files being encoded with a variable amount of data over time, like video-on-demand files, can be transmitted with constant quality despite given fluctuations in the amount of coded data, and without any interaction of the user, and thus a continuous play-back of a demanded video is provided.

6 Claims, 7 Drawing Sheets

OTHER PUBLICATIONS

Schoenen et al, Analysis & Dimensioning of Credit–Based Flow Control for the ABR service in ATM netoworks, www.ert.rwth–aachen.de/Projekte/Theo/papers/Scjoenen98glo.pdf.*

Chrysanthis et al, Management and Delivery of Multimedia Traffic. IEEE 1995.*

Babu et al, A Uniified Approach for Evaluating Call Blocking and Brust Blocking in High Speed Network IEEE 1995.*

* cited by examiner

| R | B | D |
|---|---|---|
| $R_1$ | $B_1$ | $D_1$ |
| ... | | |
| $R_n$ | $B_n$ | $D_n$ |

*Fig. 9*

```
B_max = 0
B = 0
D_max = 0
sum = 0
t = 0
for k = 0 to N-1
begin
    B = B-R_i * cell payload size * (DTS_k -t)
    if B < 0 then B = 0
    B = B + S_k
    if B > B_max then B_max = B
    sum = sum + S_k
    D = sum / (R_i * cell payload size) - DTS_k
    if D > D_max then D_max = D
    t = DTS_k
end
B_i = B_max
D_i = D_max
```

*Fig. 10*

FILE SERVER FOR MULTIMEDIA FILE DISTRIBUTION

This is a Division, of application Ser. No. 08/894,907, filed Sep. 2, 1997, currently pending.

This invention concerns distribution of multimedia files by file servers over an arbitrary network for information transfer, like a wide area network (WAN), for example the Broadband-ISDN or the Internet, or like a local area network (LAN). It is related to all time critical files which are coded with a variable amount of data over time, for instance, video files like movies, audio presentations, or teleconference presentations. In particular, the invention is directed to video-on-demand (VOD) services, as being envisaged for interactive television where the transmission quality is to remain constant despite given fluctuations in the amount of coded data, and where a continuous play-back of a demanded video is provided.

Known video file servers in such an environment serve as providers to play back compressed digital videos to clients over a telecommunication network. Those clients, on their side, need special decoders to convert the digital video signal in a television signal. These decoders comprise further a decoder buffer, and are usually implemented in a so-called Set-Top-Box. The videos are transmitted as frames of a given time duration. Commonly a predetermined constant bitrate for data file transfer is provided in order to achieve a simple management of network resources (FIG. 2). As the compression ratio and therefore the size of a compressed frame of a video depends on the respective scene content, a compressed video comprises inherently a variable bitrate. For these reasons, file servers delivering movies are confronted with the problem of an extreme time dependent variation of information amount which has to be transferred from the server to the user at a given time.

A conventional multimedia data server is disclosed in U.S. patent application Ser. No. 288525 filed on Aug. 10, 1994, by the present applicant. Thisxserver comprises a direct access storage device (DASD), a plurality of data buffers, each of said buffers corresponding to a respective time interval associated with a multimedia presentation, ahd a mass storage device for storing the multimedia presentation data. A data bus connects the mass storage with the plurality of data buffers, wherein a bus switch is provided being operated by a controller.

A Set-Top-Box for the receiving side of a multimedia communication system according to the prior art is disclosed in U.S. patent application Ser. No. 473315 filed on Jun. 7, 1995, which is also assigned to the present applicant. This device effectuates local reception and processing of multimedia programs received from a remote multimedia file server. The local Set-Top-Box control system includes a DASD adapted to buffer a predetermined number of compressed program segments received from a multimedia file server. In particular, that invention is directed to a novel formatting methodology which provides concurrent presentation and buffering of program segments received from the server for on-demand viewing of a selected multimedia program.

Further for the transmission of compressed video files over a digital telecommunication link, for instance one operating in the known Asynchronous Transfer Mode (ATM), two compression modes are currently considered: constant bitrate and variable bitrate. These modes are illustrated in FIG. 2. A respective approach to achieve a constant bitrate, is to use a special compression mechanism with a so-called "closed-loop control" in the encoder that adjusts the picture quality as a function of the encoder buffer fill level. The respective variable quantization in the compression process leads to a variable quality. The quality decreases in scenes with high image complexity or heavy motion. In contrast, a compression process with constant quantization, of course, avoids the problem of changing quality, but it produces a video file with variable bitrate over time which is difficult to manage in networks with respect to the bursty traffic due to the fluctuating rate as a function of the scene contents.

The pre-cited known techniques are published in Proceedings of the 4th Open Workshop on High Speed Networks, Brest (France), September 1994, by Marcel Graf, and entitled "Traffic Shaping of VBR Video in ATM Endsystems", which particulary concerns a method of traffic shaping, which drastically reduces the burstiness of a video stream.

A typical scenario for use of a file server coupled to a WAN is that at connection set-up time the user negotiates with the respective network provider a traffic contract that specifies the traffic the user injects to the network and the so-called "Quality of Service" (QoS) the user gets from the network. On the user side a traffic shaping function shapes the outgoing traffic so as to comply with the contract by buffering the cells to be sent. Traffic shaping is a means to control the burstiness of the traffic, but the transmission of realtime data imposes further constraints on traffic shaping. The individual video frames must arrive on time at the receiver. To eliminate jitter introduced in the transmission process, the receiver buffers the incoming frames in a smoothing buffer before they are decoded. The traffic shaping function introduces additional jitter. These two types of jitter need to be eliminated.

In the above article by M. Graf the trade-off between reducing burstiness and generating additional jitter and smoothing delay is analyzed, too. The proposed solution is a fluid model for video transmission, which enables to determine the jitter and smoothing delay introduced by shaping, as well as the buffer capacity requirements at the sender side and the receiver side. Jitter smoothing is achieved by properly delaying the start of the video decoder, wherein buffer underflow must be avoided, i.e. the consumption instant of each frame must not be earlier than the arrival instant of the frame in the buffer. In the article it is shown that jitter smoothing introduces an additional delay equivalent to the maximum jitter appearing in the frame sequence. It is observed that for movies or music recordings the quality of transmission is much more important than the starting time of a respective presentation. The user is already accustomed to initial delays in this area due to the necessary operation steps when starting a video tape on a video assembly or recorded music on a tape recorder. Hereby an initial delay of up to about ten seconds can be tolerated.

A similar approach is disclosed in an conference article by Wu-Chi Feng and S. Sechrest in Proceedings of the SPIE–The International Society for Optical Engineering (1995) Vol. 2417, p. 234–242, and entitled "Smoothing and buffering for delivery of prerecorded compressed video". The authors propose a method for smoothing and buffering digital video data for delivery of pre-recorded compressed videos. The article is also concerned with the problem that transportation of compressed video data require the network to adapt to large fluctuations in bandwidth requirements if the quality of the video is to remain constant. The proposed use of a technique of averaging for smoothing video data allows for smoothing at the expense of a further source for delay.

A further prior art approach concerning multimedia video file distribution over WANs, given for example in U.S. Pat. No. 5,613,057, which is assigned to the present applicant. The invention described there—in contrast to the aforementioned approaches—intends to reduce the delay experienced by a user between the time of a presentation request and the presentation to the user, itself It is proposed to utilize two distributions sites, intermediate sites with which users interact and which combine limited storage facilities and fast communication channels for interacting with users. A main distribution site provides mass storage for files and slower and cheaper communication channels to the intermediate sites for the file distribution. The intermediate sites provide partial caching for some number of files. When a presentation request is received from a user at the intermediate site, the intermediate site determines if the file is already partially cached. If so, an interrupted viewing is immediately available at the intermediate site. If not, the intermediate site determines from the size of the file and the transfer rate between the sites the amount of time that will be required for transfer. The described file server concept is also applicable for the present invention.

Further in U.S. Pat. No. 5,808,607, which is assigned to the present applicant, a method of work scheduling in a multinode multimedia file server for a distributed computerized system is disclosed, which stores and transmits movies in digitized form. Multiple nodes are linked together in an interconnect network. Each node has a processor, buffers, output ports and communication paths with a non-volatile storage for the video data. Each node services a ste of viewers for a particular movie for a particular temporal frame. Proposed is a method for optimizing the processing of video requests, whereby the movies are stored in buffers rather than having to be retrieved from the non-volatile storage. In this approach the time scale for scheduling is about minutes, and thus quite different from the time scale underlying.

Another scheduling mechanism for video-on-demand is disclosed in U.S. Pat. No. 5,561,456, which is also assigned to the present applicant. The proposed scheduler maintains a queue of pending performance for at least one movie, and determines a maximum wait tolerance time for a longest waiting one of the pending performance requests, whereby the time scale is about minutes. When the respective stream capacities become available, rather than scheduling the movie immediately, the scheduler delays performance of the video until just prior to expiration of the maximum wait tolerance time of the longest waiting one of the pending performance requests. In the interim additional streams can join the queue.

A further approach concerning tolerance times for longest waiting is disclosed in the International (PCT) patent application Ser. No. WO 9103112 A which has been published in July 1995. By use of a program transmission optimization mechanism, especially for cable TV networks, segmented programs are transmitted in redundant sequence in accordance with a scheduling algorithm. The maximum response time corresponding to a maximum time a user need wait to commence playing a requested program is selected. The scheduling algorithm used in the transmission phase ensures that the respective receiver will receive all of the program segments in a manner that will enable continuous play-back in real time of the program at the receiving side.

The drawback of a first part of the beforehand discussed approaches is that they need scheduling algorithms executed at the time of delivery of a presentation file. Thereupon they need execution of complex algorithms to smooth the video data, also at the time of delivery of a file. The other approaches are insofar disadvantageous as they use only a fixed pre-computed schedule for delivery.

It is therefore an object of the present invention to provide a multimedia file distribution mechanism and a multimedia file server, which allow a constant quality of transmission despite of the different beforehand discussed requirements for transmission of data via a WAN. In addition, these requirements should be fulfilled automatically and without a great expense of processes run at time of delivery, and should not require further interactions by the user. A particular problem to be solved are the rate fluctuations between the transferred frames representing different scenes in video-on-demand services.

The present invention solves this problem by providing an additional time delay for the presentation of a multimedia file in order to account for the delayed arrival of frames at the receiver due to the spreading of the transmission of these frames over time. The respective delay values for different multimedia files are calculated off-line, i.e. before delivery, and the respective control parameters for transmission are appended to each of the multimedia files; and a rate control mechanism in the server. The proposed control parameters guarantee an optimal adaptation of the time delay to the existing network environment, in particular the transmission bandwidth. The proposed rate control mechanism when provided with the respective control parameters, produces the schedule for the transmission of the video file that prevents buffer underflow or overflow in the receiver. The time delay can be simply adapted to other features of the underlying network, for instance the costs of the transmission or the storage capacity on the receiving side. The initialisation of the working point of the above control parameters to the network environment like transmission rate, and/or to the user environment like the encoder buffer size, is accomplished at the time of delivery of a respective multimedia file, and can be adjusted without any interaction by the user, and is thus transparent to the user.

The relationship between additional time delay and transmission rate can be calculated, for instance, by the file server, by scanning the respective presentation files to be served. The procedure has linear complexity with the length of a respective file, and thus takes only a few minutes for typical files, due to the proposed fast algorithm. This algorithm is based on the method of smoothing the transmission rate over time of the respective file. That curve is characterized by numerous peaks due to the different information content of the different multimedia events, like action sequences of movies or complex acoustic events. Those peaks are reduced by spreading the respective data, shifting it to later time of the transfer process. Hereby the additional delay time is introduced according to the respective time shift.

In a preferred embodiment the delay/transmission data is stored at the beginning of the respective presentation file, i.e. prepended, and thus can be taken into account at the initialisation stage of the presentation.

BRIEF DESCRIPTION OF THE DRAWINGS

These and other features, aspects and advantages of the present invention over the prior art approaches will be apparent from the following detailed description and the claims, by way of preferred embodiment, and with reference to the drawings, where

FIG. 9 shows a table containing control data for delivery of multimedia files according to the present invention; and FIG. 10 shows a program code implementation of an algorithm for determining receiver buffer size and initial time delay, according to an embodiment of the present invention.

The preferred embodiments of the present invention described in detail in the following part, concern Video-on-Demand (VoD) networking where a video server plays back compressed digital video. But beyond this, the proposed method and fileserver according to the invention can also be implemented in a pure audio environment, where Audio Presentation Units are compressed to variable-length Audio Access Units that are to be transferred, or in the area of multimedia telecommunication, for instance teleconferencing, where a video presentation is to be transferred to a group of participants.

Figure 1:
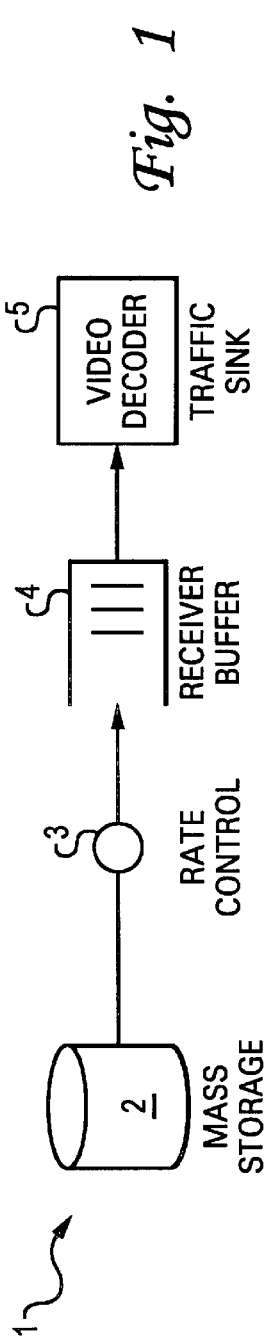
FIG. 1 is a schematic diagram illustrating a fluid model of video transmission in a Video-on-Demand (VoD) network according to the prior art.
Figure 2:
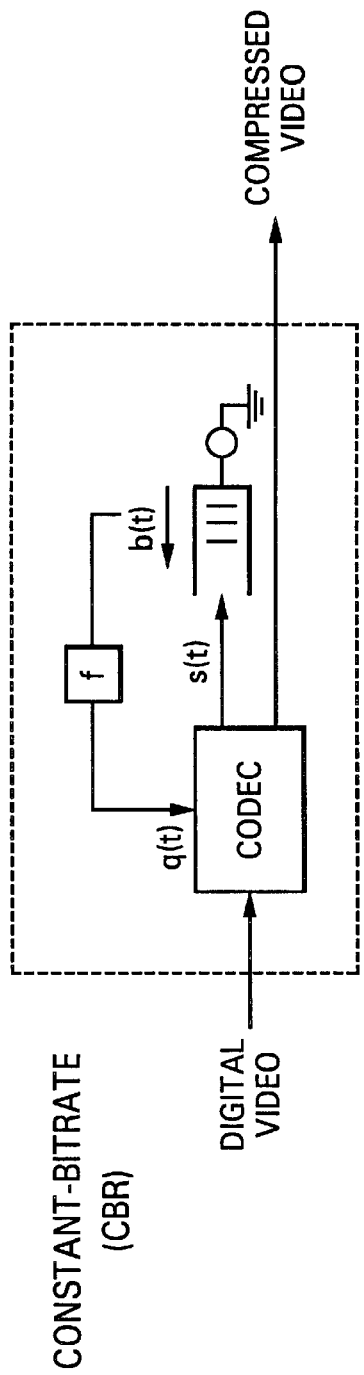
FIG. 2 is a comparison chart showing constant bitrate compression vs. variable bitrate compression.

FIG. 1 shows a model of video transmission with traffic shaping. On the sender side 1 the video file is read from a mass storage 2 and then sent with the help of a rate control device that shapes the traffic as it enters the network. The model neglects delay and delay jitter in the network, therefore in the model the output of the rate control is directly fed in a receiver buffer 4. There it is buffered before being read out by a video decoder 5. In a real receiver implementation additional buffer and synchronization means are necessary to cope with network-induced delay jitter. It is noted that the present invention is applicable to frames of video files both with a constant and a variable intermediate arrival distance.

Traffic shaping means that the transmission of coded information is spread over time, and that therefore the arrival of the information at the receiver is delayed (in the present case of stored video it is possible to send information in advance, alleviating the problem of delay, but not for the initial frames). Therefore the receiver has to delay the decoding of the video by an initial delay value D relative to the start of the transmission.

Figure 3:
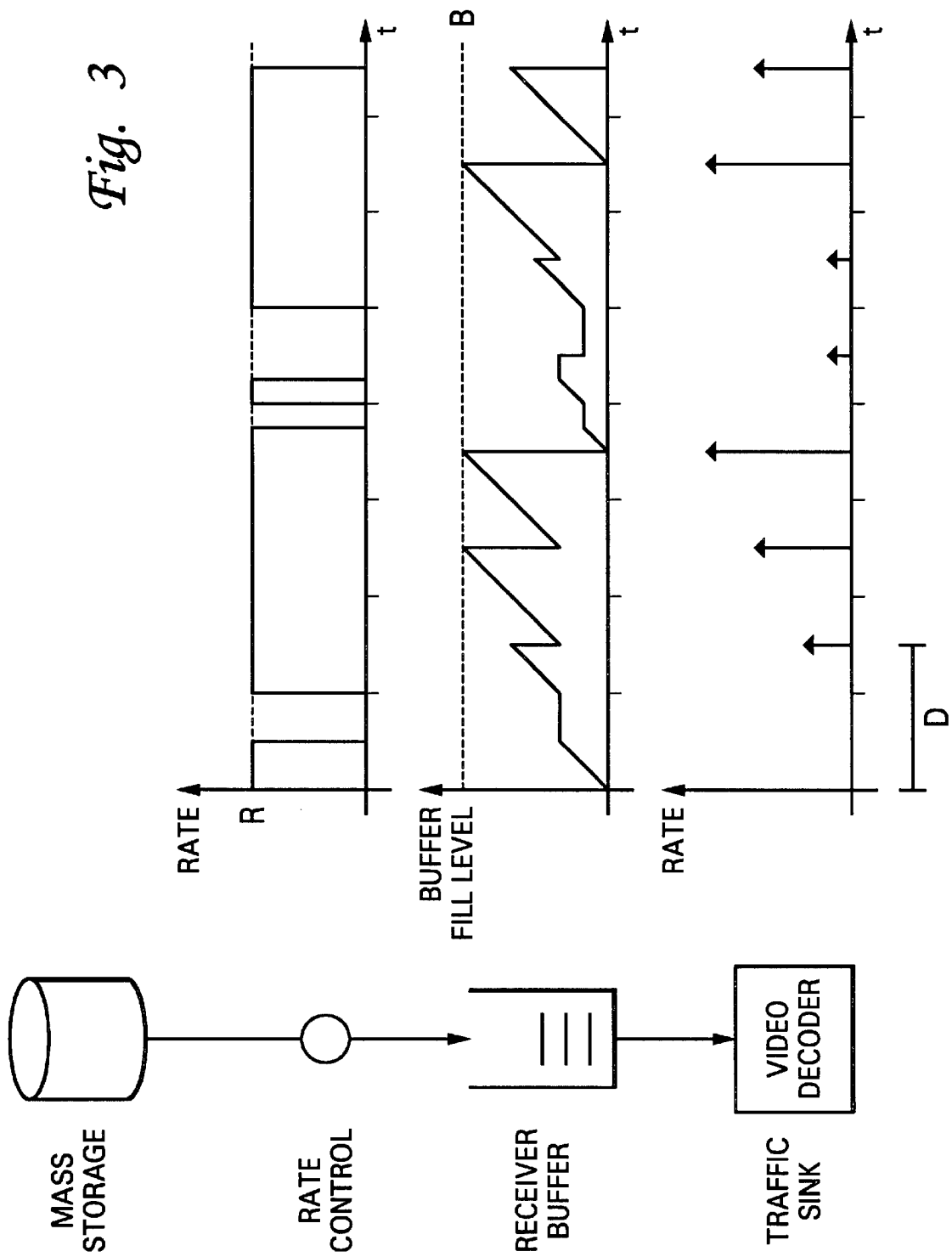
FIG. 3 depicts an exemplary path for the fluid model shown in FIG. 1, for a video file comprising isochronous frames.

The rate control alternates between an idle state and an active state where it sends data at a fixed rate R'. The fixed rate eases implementation as the rate has to be programmed only once at initialization. A sample path of the model according to FIG. 1 is shown in FIG. 3. For simplicity the model assumes that the traffic behaves like a fluid and is infinitely divisable. The slope of the receiver buffer fill level curve corresponds to the rate R'. It is assumed that the decoder takes data in chunks out of the receiver buffer called Access Units (AU), and that these AUs are taken instantly out of the buffer.

The rate control prevents overflow of the receiver buffer by keeping track of the free receiver buffer capacity with the help of a counter 420. When the counter indicates that there is still free space in the receiver buffer (counter <0), the rate control is in the active state, when it indicates that all space is taken (counter=0), the rate control goes to the idle state.

The rate control continuously updates the counter. It decrements the counter at rate R' when it is in the active state. It increments the counter each time it knows the receiver to have taken data from the buffer by the amount of that data.

The information about when the receiver takes data out of the buffer is available to the rate control by parsing the coded video stream. The video stream contains coded representations of video data, called Video Access Units (VAU), audio data, called Audio Access Units (AAU) and coding overhead data, called Coding Overhead Units (COU), which are collectively referred to as Data Units in the following. By parsing the syntax of the compressed video stream the rate control extracts information about (a) the size of an Data Unit and about (b) the time (in the form of a timestamp) this Data Unit has to be decoded by the decoder. When the video stream is encoded according to the ISO/IEC 13818-1 standard, for example, these values are explicitly included, but they may also be coded implicitly. The rate control accounts for the receiver delay D by adding the value of D to the timestamps.

To decouple the sending of the compressed video data from the parsing operation, the rate control buffers the size and timestamp information in a buffer. For this purpose it generates for each Data Unit a token that can be put in a token buffer. A token consists of a size value and a timestamp. To update the counter the rate control takes the tokens out of the token buffer at the time indicated by their respective timestamp and increments the counter by the respective size value.

For a correct operation of the system that avoids receiver buffer underflow and overflow, the parameters R', B and D must be correctly chosen depending on the video file to be transmitted. The dependencies B=f(R') and D=f(R') can be determined in advance by examining the compressed video file as explained in the following, and by storing the results, e.g., in form of a table. At presentation time the table can be consulted by using, e.g., the receiver buffer size B as index and the values of R' and D can be quickly determined.

Figure 4:
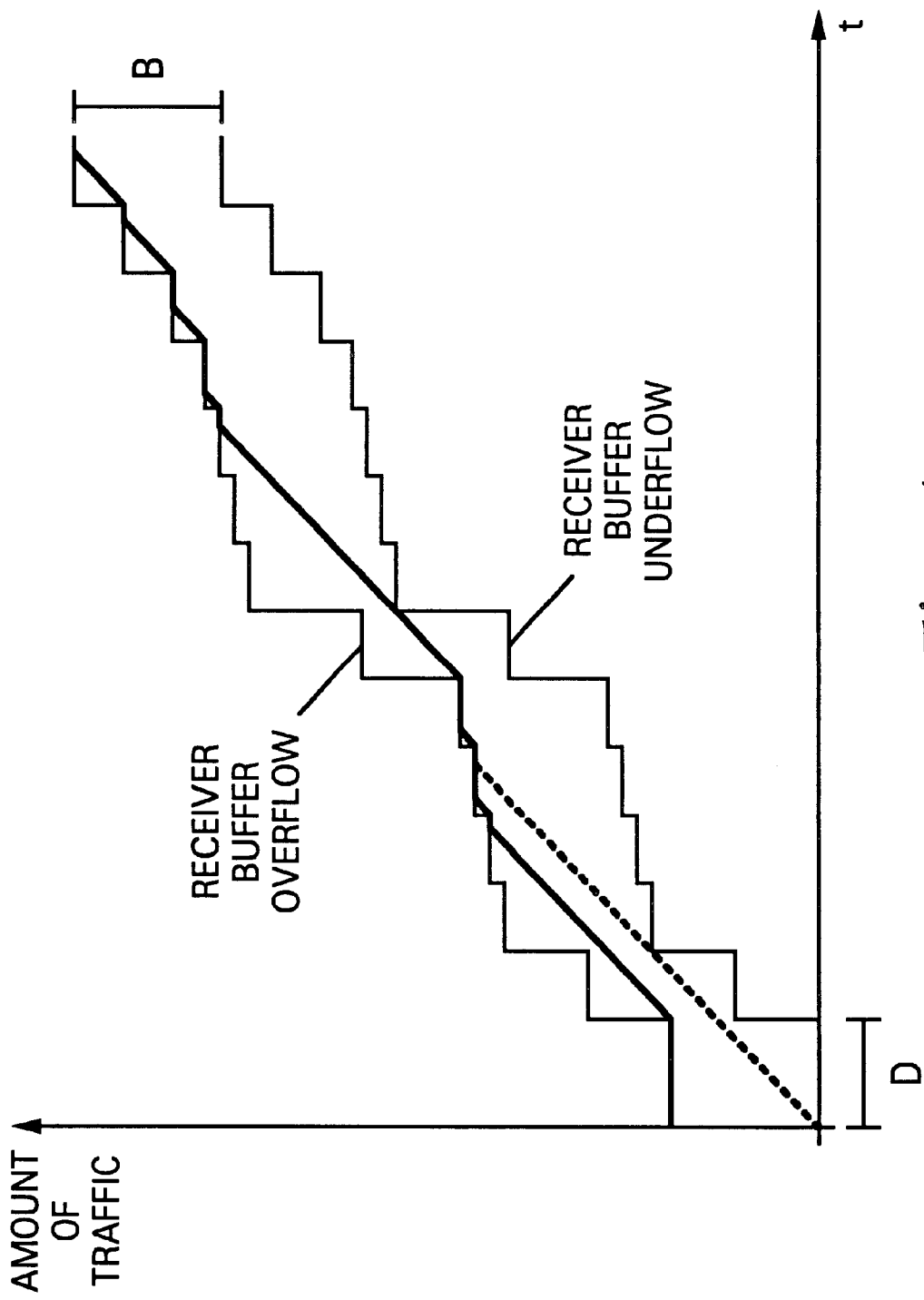
FIG. 4 shows an exemplary transmission path as seen on the receiver side of a Video-On-Demand network, including the bounds imposed on the path to avoid receiver buffer underflow and overflow.

FIG. 4 shows the constraints the receiver buffer imposes on the output traffic of the rate control. In the coordinate system the total amount of traffic transmitted up to time t, which is—under the assumptions made in the model of FIG. 1—equal to the total amount of traffic received up to time t, is plotted over t. Two constraint curves are shown: the curve labeled 'receiver buffer overflow' is an upper bound for the traffic that must not be exceeded, or else the buffer overflows, and likewise the curve labeled 'receiver buffer overflow' is a lower bound for the prevention of buffer underflow. The form of the curves is determined by the video file: a step in the curve corresponds to the decoder taking an Data Unit out of the buffer, the step size corresponds to the size of the Access Unit. The position of the curves is determined by the parameters B and D as shown in the figure.

For a given rate R' a minimal value for the required receiver buffer size B can be determined by constructing the curve of the rate control output traffic shown in bold in the figure. This traffic curve only depends on the 'receiver buffer overflow' curve, as the rate control always tries to keep the receiver buffer full. To be able to construct the curve it is necessary to assume in a first step that the receiver buffer is already completely filled at initialization. Then the traffic curve depends only on the form of the overflow curve, and not on its location. The value of B is determined by shifting the 'receiver buffer overflow' curve together with the traffic curve downwards as far as possible, until the traffic curve touches the 'receiver buffer underflow' curve. The distance between the overflow and underflow curve is the value of B. B can be determined algorithmically by calculating the maximum difference between the overflow curve and the traffic curve at the edges of the overflow curve.

For a given rate R' a minimal value for the required receiver delay D can be determined by constructing an initial buffer loading curve shown as dotted line in the figure. This initial buffer loading curve is a straight line of slope R' that represents the first active period of the rate control after initialization until the receiver buffer is completely filled, verifying the previously made assumption. As this line must not cross the 'receiver buffer underflow' curve, the minimal value of D is determined by shifting the line as far as possible to the right until it touches the underflow curve. The value of D is the distance between the intersection of the line with the t-axis and the decoding of the first Data Unit. D can be determined algorithmically by calculating the maximum distance between the intersections with the t-axis of lines going through the edges of the underflow curve and the decoding of the first Data Unit.

Figure 5:
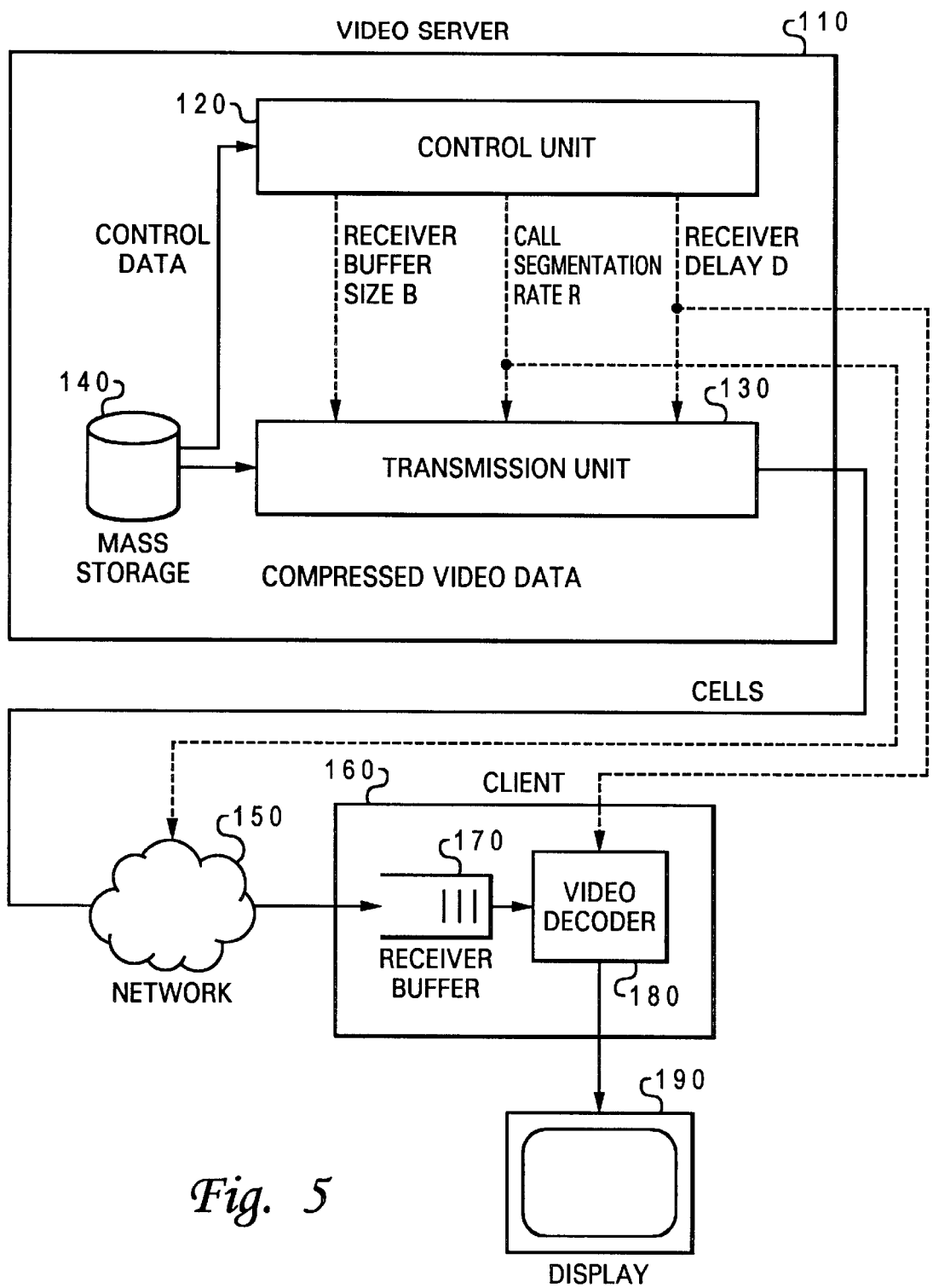
FIG. 5 gives an overview for the multimedia file distribution environment according to the present invention.

The environment in which the proposed video server is used is shown in FIG. 5. In this embodiment the digitized video files are coded, for instance, according to the ISO/IEC 13818-1 standard. To achieve constant quality the files are coded with a variable bitrate. The video server 110 transmits the compressed and coded digital video over a network 150 to a client 160 (receiver) which decompresses the video and converts it to a video signal that can be viewed on a display 190. It is emphasized that the network can use any transmission protocol, besides ATM also the so-called Synchronous Digital Hierarchy (SDH), or the Synchronous Optical Network (SONET) protocol, or may be any mix of Broadband Integrated Services Digital Network (B-ISDN) transport and switching systems. ATM provides bandwidth on demand, i.e. connections with almost arbitrary bandwidth. This fact is exploited by the present invention by adapting the required transmission bandwidth according to the control parameters.

The video server 110 includes a control unit 120, a transmission unit 130, and a mass storage 140. On the receiver side, the dlient provides a receiver buffer 170 and a video decoder 180. To serve a client's request for transmission of a video program, the control unit 120 reads control data associated with the particular video program from the mass storage 1440. Given the buffer size of the receiver buffer 170 it determines additional parameters for controlling the operation of the transmission unit 130 and the video decoder 180. The transmission unit 130 receives from the control unit 120 the parameters receiver buffer size B, receiver delay D and the cell segmentation rate R. The network 150 receives the parameter cell segmentation rate R. The video decoder 180 receives the parameter receiver delay D. The last two parameters may also be transported, for example, in a signalling message. All parameters are constant during the transmission of the video file in this embodiment.

The video server 110 uses the proposed algorithm to determine from the receiver buffer size the minimal peak transmission rate required for a particular video program. This peak rate is used to set up a data communication channel to the receiver by reserving the peak rate in the network 150. The receiver 160 must delay the decoding of the video to allow the buffer 170 to fill at initialization. The video server 110 uses the proposed algorithm to determine the minimal delay from the receiver buffer size and chosen peak rate, and provides this value to the receiver 160. The video server, therefore, is able to play back the same variable-rate video program using different peak rates and delays adapted to the buffer capacities of the receivers.

During playback the video server either sends the stream at the chosen peak rate or is idle. A closed-loop control in the server models the receiver buffer fill level and switches between the two states, thus avoiding receiver buffer overflow. The choice of the parameters peak transmission rate and initial time delay by the proposed algorithm guarantees to avoid receiver buffer underflow.

When the above parameters are determined and the network 150 has established a connection from the server 110 to the client 160, transmission of the video file (program) starts. The transmission unit reads the compressed video data from the mass storage 140 and segments it into cells for transmission over the network 150. The client 160 receives the cells and buffers them in the receiver buffer 170. After waiting D time units after reception of the first cell, the video decoder 180 starts decoding the compressed video data and converts it to a video signal that is fed to the display 190. Note that usually the client 160 has an additional buffer and uses an additional delay to eliminate jitter introduced in the network and to help in decoding.

Figure 6:
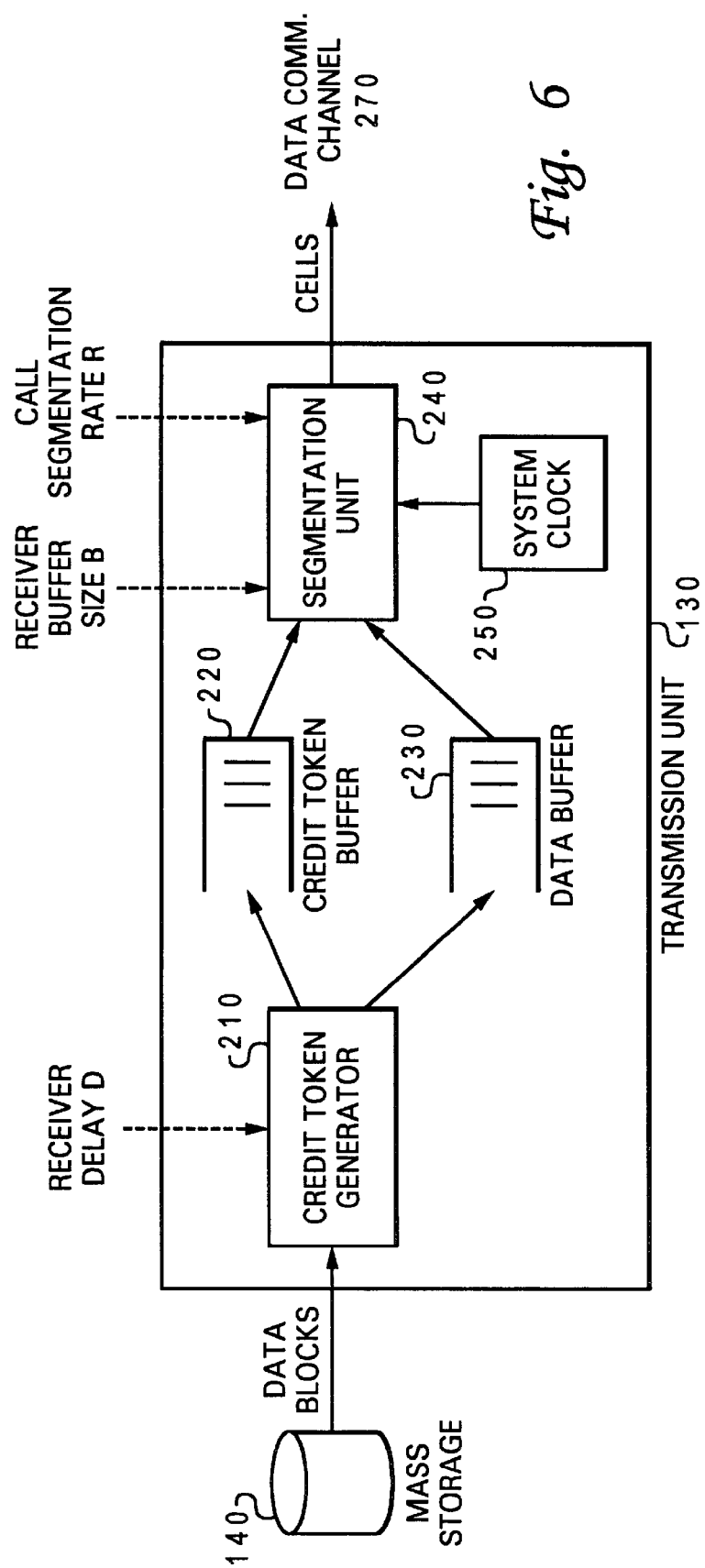
FIG. 6 shows a preferred embodiment of a transmission unit according to the present invention.

The transmission unit 130 depicted in FIG. 6 includes a credit token generator 210, a credit token buffer 220, a data buffer 230, a segmentation unit 240, and a system clock 250. Data blocks of the compressed video program are read from the mass storage 140 and provided to the credit token generator 210. The credit token generator 210 parses the data block for Data Units (DU) and generates for each DU a credit token. A credit token consists of a timestamp representing the time the receiver will take the DU out of its buffer, and a credit value representing the size of the DU. The credit tokens are buffered in the token buffer 220. Further the data blocks read from the mass storage 140 are buffered in the data buffer 230.

The segmentation unit 240 reads the data from the data buffer 230 and segments it in ATM cells. The segmentation process is controlled by the credit tokens that are. read from the credit token buffer 220. The system clock 250 provides the reference clock for the segmentation unit 240.

Figure 7:
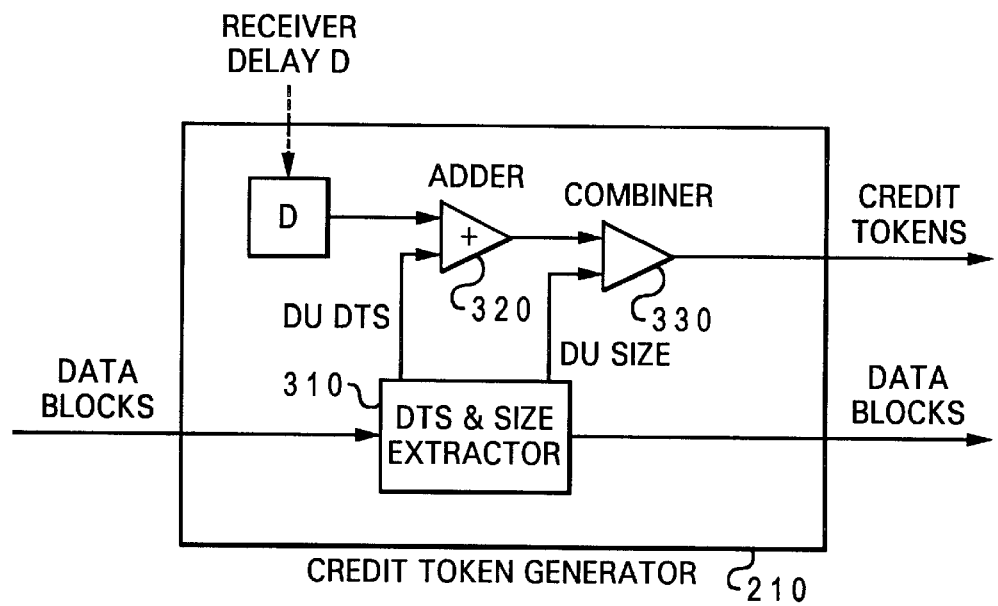
FIG. 7 shows a preferred embodiment of a credit token generator contained in a transmission unit according to FIG. 6.

FIG. 7 shows a preferred embodiment of the credit token generator 210. It includes a so-called "decoding time stamp & size extractor" 310 (DTSE), an adder 320, and a combiner 330. The DTSE 310 parses the compressed video stream and extracts for each DU found in the stream its decoding time stamp and size. These values are used to provide a credit token for the DU. The decoding time stamp is the time instant the receiver takes the DU from the receiver buffer when the receiver delay D would be zero.

The DTSE 310 categorizes each data byte in the video stream as belonging to one of three types of DUs:
(1) Video Access Units (VAU);
(2) Audio Acess Units (AAU);
(3) all bytes not contained in (1) or (2) are considered to be part of a third type of DUs, referred to as Coding Overhead Units (COU) in the following.

VAUs and AAUs are directly coded in the stream according to the ISO/IEC 13818-1 standard, together with the respective DTSS. When a VAU or AAU has no DTS, the DTS is extrapolated from preceding DTS values. To account for a systems layer overhead in the data, the DTSE generates at regular time intervals a COU that contains all the bytes not contained in (1) or (2), and issues a DTS and size value for it. This may be achieved by generating a COU each time a system clock reference or a program clock reference according to the above standard is encountered in the stream, using this value as DTS.

The DTS is provided together with the receiver delay parameter D from the control unit to the adder which adds the values. The resulting time stamp is combined with the DU size by the combiner to form a credit token.

Figure 8:
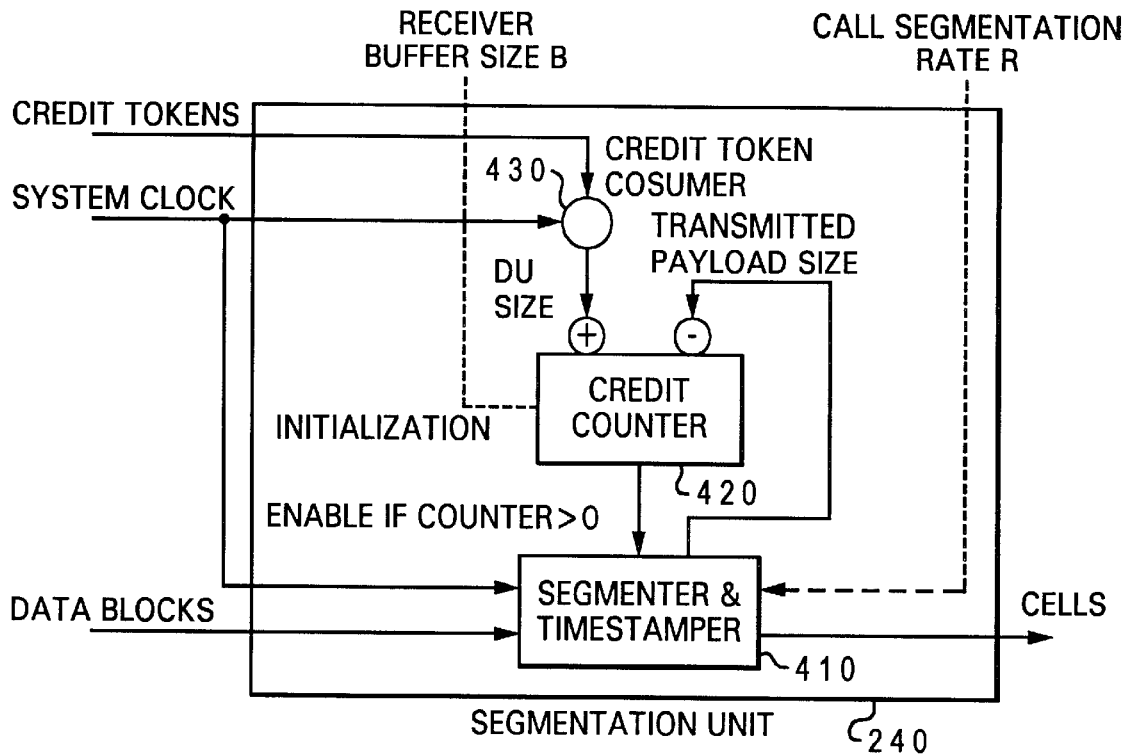
FIG. 8 shows a preferred embodiment of a segmentation unit contained in a transmission unit according to FIG. 6.

The segmentation unit 240 shown in FIG. 8 includes a so-called "segmenter & timestamper" 410 (STS), a credit counter 420, and a credit token consumer 430. The STS 410 segments the compressed video data in ATM cells. It has two states, in a first state it segments cells at the cell segmentation rate R provided by the control Unit (ENABLE) or it is idle (DISABLE). It regulary includes timestamps in the compressed video stream that represent the current value of the system clock 250. These are used by the receiver to synchronize its clock to the file server, in accordance with the precited standard.

The state of the STS 410 is controlled by the credit counter 420. The credit counter 420 keeps track of the free receiver buffer and prevents receiver buffer overflow. It enables the STS 410 as long as its counter value is greater than zero. The credit tokens increment it and the transmitted cells decrement it. In case of reaching a negative value it is reset to zero. Its initial value is set to the receiver buffer size parameter B provided by the control unit 120.

The credit token consumer 430 receives the system clock 250 and uses it to read credit tokens from the credit token buffer 220 at the time instants indicated by their respective timestamps. When it consumes a credit token, it increments the credit counter 420 by the value of the DU size given by the token. The STS 410 decrements the credit counter 420 each time it segments a cell by the value of the transmitted cell size.

The control unit 120 uses control data associated with a particular compressed video program to determine from the receiver buffer size B the receiver delay D and the cell segmentation rate R.

In this embodiment the control data includes a table shown in FIG. 9 that has entries for the cell segmentation rate R, the receiver buffer size B, and the receiver delay D. For instance, a table entry i provides a tuple ($R_i$, $B_i$, $D_i$). It is likely that the network provides data. communication channels whose bandwidth must be chosen among a set of discrete values. In that case the table entries advantageously correspond to the discrete bandwidth values offered by the network. Provided with a receiver buffer size B, the control unit searches the table for the lowest cell segmentation rate $R_i$ that has an entry $B_i$ lower or equal to B. It then provides the values ($R_i$, $B_i$, $D_i$) to the transmission unit and $D_i$ to the client.

The table is constructed offline by parsing the compressed video program and repeatedly executing the exemplary algorithm shown in FIG. 10. For a given cell segmentation rate $R_i$, by use of the algorithm the buffer size $B_i$ and the receiver delay $D_i$ are determined. The resulting values are stored in the table. The algorithm is provided with the output values of the DTSE. The sequence of (DU DTS, DU size) values at its output is denoted in the figure as ($DTS_k$, $S_k$), k=0 . . . N-1.

What is claimed is:

1. A file server for distributing multimedia files within a network offering limited bandwidth connections for transmission of said multimedia files, said file server comprising:
   a mass storage device for storing a plurality of digitized multimedia files together with control data;
   a control unit for receiving and parsing a respective digitized multimedia file from said mass storage device to determine transmission parameters from said control data for said respective multimedia file, wherein said transmission parameters include a receiver buffer size, a receiver delay, and a cell segmentation rate, said control unit:
      delivering said transmission parameters to a transmission unit, wherein said transmission unit delivers said multimedia files to said receiver buffer in accordance with said transmission parameters;
      delivering said cell segmentation rate to said network; and
      delivering said receiver delay value to a video decoder that receives input from said receiver buffer.

2. The file server according to claim 1, where said control data include a receiver buffer size, a peak transmission rate, and an additional delay.

3. The file server according to claim 1, where said transmission unit is characterized by:
   a credit token generator reading data blocks of said multimedia files from said mass storage, parsing said data blocks for data units, and generating for each data unit a credit token which consists of:
      a timestamp representing the time the respective receiver will take said data unit out of its buffer;
      a credit value representing the size of said data unit;
      a credit token buffer buffering said credit tokens;
      a data buffer buffering said data blocks read from said mass storage;
      a segmentation unit reading data from said databuffer and segmenting said data in cells with respect to said credit tokens; and
      a system clock providing a reference clock for said segmentation unit.

4. The file server according to claim 3, where said credit token generator is further characterized by:
   a decoding time stamp extractor parsing said multimedia files and extracting for each of said data units a decoding time stamp;
   a size extractor parsing said multimedia files and extracting for each of said data units the size;
   an adder unit adding the values of said decoding time stamp together with said control data; and
   a combiner unit combining the resulting timestamp with said size of said data unit to form a credit token.

5. The file server according to claim 3, where said segmentation unit is further characterized by:
   a segmenter unit segmenting said multimedia files in said cells;
   a credit counter controlling said segmenter by keeping track of free receiver buffer; and
   a credit token consumer receiving said system clock, and using said system clock to read said credit tokens from said credit token buffer at the time instants indicated by the respective timestamps.

6. The file server according to claim 1, which is further characterized by means for parsing the multimedia files to gather said control data.

* * * * *